No. 862,739. PATENTED AUG. 6, 1907.
A. C. HUMMER.
BOX FOR SHIPPING AND STORING BUTTER.
APPLICATION FILED MAR. 14, 1906.
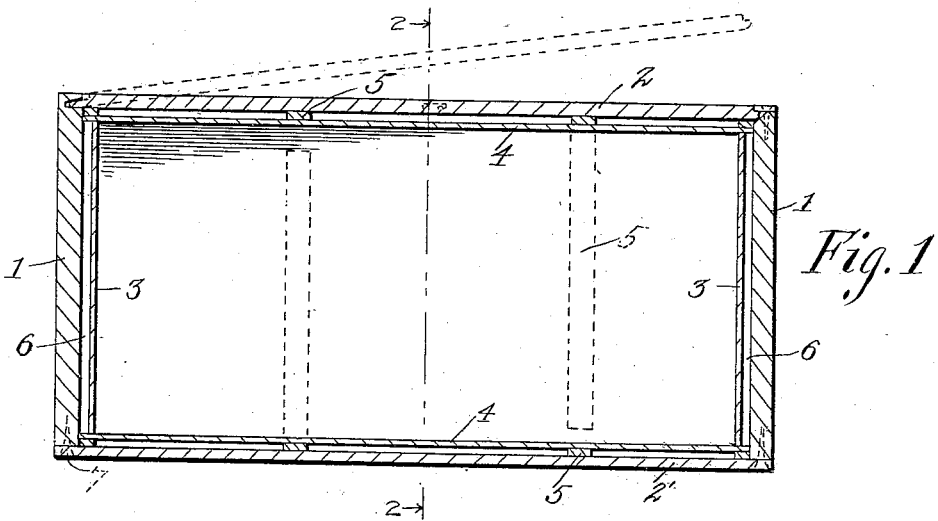
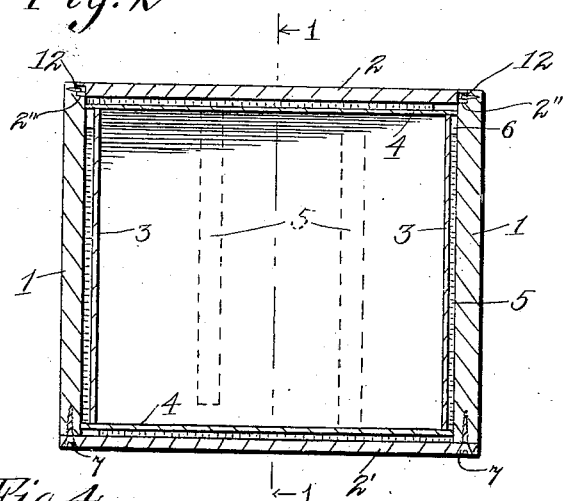
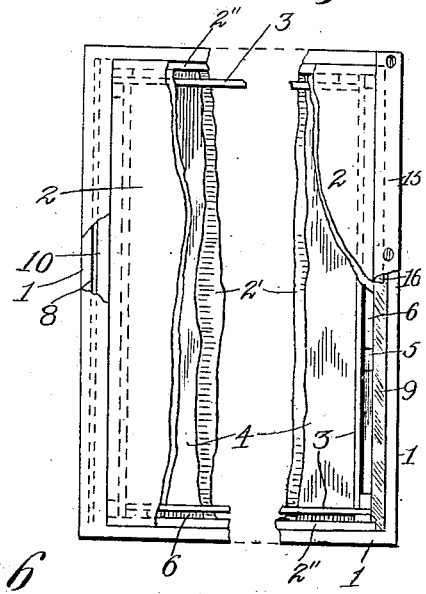
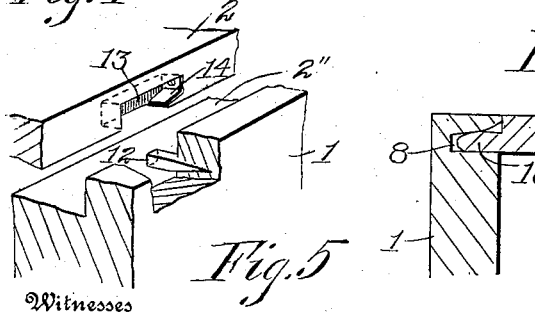
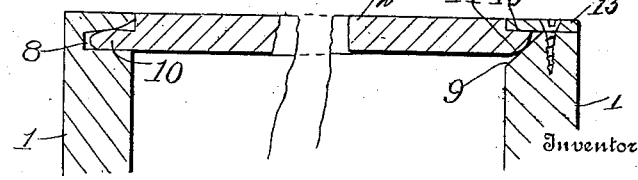
Witnesses
Urlita Adams
Edward W. Cressman
Inventor
Arthur C. Hummer
By Adams & Brooks
Attorneys

UNITED STATES PATENT OFFICE.

ARTHUR C. HUMMER, OF SEATTLE, WASHINGTON, ASSIGNOR OF ONE-HALF TO THE UNITED PRODUCE COMPANY, A CORPORATION OF WASHINGTON, AND ONE-HALF TO GEORGE O. BREHM AND ROBERT MUNRO, JR., ALL OF SEATTLE, WASHINGTON.

BOX FOR SHIPPING AND STORING BUTTER.

No. 862,739.      Specification of Letters Patent.      Patented Aug. 6, 1907.

Application filed March 14, 1906. Serial No. 306,044.

*To all whom it may concern:*

Be it known that I, ARTHUR C. HUMMER, a citizen of the United States of America, and a resident of the city of Seattle, in the county of King and State of Washington, have invented certain new and useful Improvements in Boxes for Shipping and Storing Butter, of which the following is a specification.

My invention has special reference to improvements in boxes for shipping and storing butter and the primary object thereof is to provide a package of the above nature which shall be efficient in preserving the contents and which can be readily packed and unpacked.

With the above and other desirable objects in view, to be referred to in the following, my invention resides in the constructions and arrangement of parts as set forth in this specification and defined in the appended claims.

Referring to the accompanying drawing, in which similar reference numerals designate corresponding parts throughout the several views: Figure 1 is a view of my improved box in longitudinal section, on line 1—1 of Fig. 2, and showing by broken lines the top wall or cover of the casing in position to be swung downwardly to its seat. Fig. 2 is a transverse section on line 2—2 of Fig. 1. Fig. 3 is a fragmentary plan view. Figs. 4 and 5 are fragmentary perspective views showing details, and Fig. 6 is a fragmentary sectional view on large scale.

In carrying out my invention I provide a suitable casing consisting of side and end walls 1, secured together to form a firm body, and removable top and bottom covers or walls 2, 2', and within this casing is arranged a suitable receptacle for the butter. This receptacle is formed of side and end walls 3 and top and bottom walls 4, all of which walls are unsecured and held spaced from the adjacent walls of the casing by spacing strips 5, secured to the walls 3 and 4 respectively, whereby spaces, as 6, for the reception of salt, brine or other preserving material, are provided, and these spaces are normally closed to any communication with each other, as will now be explained.

The side and end walls 3, as now considered, are arranged parallel to the side and end walls 1 and each has one end abutting one wall of the casing and the other end thereof spaced from the opposite wall of the casing, thus by reference to Fig. 3, it will be observed, that one side wall 3 has one end which abuts one end wall 1, and its other end is spaced from the opposite end wall of the casing, and the other side wall 3 abuts at one end the other end wall of the casing and has its other end spaced from the first mentioned end wall of the casing, and the end walls 3 are arranged in a like manner relatively to the side walls of the casing, each extending across and abutting the end of a side wall 3 and having its ends engaging the opposite side wall 3 and that side wall of the casing adjacent to which the first mentioned side wall 3 is arranged. Thus, one side and end wall of each space 6 is formed by the adjacent walls of the casing, and the other side and end wall of said space, formed by one entire wall of the receptacle and that portion of another wall thereof which extends from the first named wall of the receptacle to the adjacent wall of the casing.

The top and bottom walls 4 are of approximately the same dimensions as the interior of the casing so as to have a snug fit therein and close the upper and lower ends of both the receptacle and the spaces 6.

While I have hereinbefore stated that the spaces 6 are intended for the reception of preserving material, yet if it be desired, they can be obviously left vacant and thereby constitute dead air chambers.

To pack salt or the like about the receptacle, the operation is as follows: The top walls 2 and 4 respectively are removed and the preserving material can then be readily packed into those spaces 6 between the side and end walls of the receptacle and casing respectively. Then wall or cover 4 is inserted into position and preserving material is placed thereon in sufficient quantity to fill the space which normally exists between it and wall 2. Then wall 2 is secured in place on its seat, formed by shoulders 2'' on the inner faces of the end walls 1 and the box inverted after which the bottom wall 2' is removed and preserving material packed in the casing on the bottom wall of the receptacle, after which the bottom wall 2' is secured in place, as by screws 7.

The means for securing wall 2 to the body of the casing is of novel construction, and the description thereof will now be proceeded with.

One wall of the casing as now considered a side wall, adjacent its upper edge has its inner face formed with a recess 8 whose outer end is slightly flared as clearly shown in Fig. 3, and the opposite side wall has its upper portion on its inner side cut to present an inclined face 9 and the said top wall has a tongue 10 on one of its edges which is shaped to wedge tightly in said recess 8, and has its opposite edge portion slightly rounded, as at 11.

By the construction just described, it will be observed that to fit the cover or wall 2 in the casing the tongue 10 must be first forced partly into the recess 8, then said wall 2 swung downwardly from the dotted position shown in Fig. 1 and when the rounded edge portion 11 of the top wall strikes the inclined face 9, said cover will be obviously moved bodily in a lateral direction, thereby forcing the tongue 10 tightly into its recess 8.

Reference numerals 12 indicate lugs projecting from the inner faces of the end walls of the box, and these lugs are received in recesses 13 formed in the end edge portions of wall 2, when wall 2 is lowered, and when said wall is shifted laterally, as heretofore described, said lugs engage the inclined cam faces 14 in said recesses 13 and thereby serve to draw down and firmly hold the cover on the shoulders 2″. After the cover or wall 2 has been thus secured and held seated, a metal strip, as 15, is secured to the box, and this strip projects over portions of the inclined face 9 and covers rounded edge portion 11, which are exposed, thereby protecting the same and further preventing any lateral shifting of the cover which would serve to displace the same, and engages in a seat, 16 formed in the upper face of the cover.

To remove the cover or top wall 2, the metal strip 15 is first removed, then a chisel or other suitable instrument driven between said wall 2 and the casing at a point above the rib and then swung to one side to effect a lateral shift of the cover, and during this movement of the cover the rounded edge portion 11 thereof will be compelled to ride up the inclined face 9. Then the cover is freed and that edge portion thereof which has the rounded portion can be readily grasped and the cover lifted from the casing.

Having thus described my invention, what I claim as new, and desire to secure by Letters Patent of the United States of America, is:—

1. A box for shipping and storing butter comprising a casing, and a receptacle therein having walls spaced from the casing to provide suitable spaces, each wall of said receptacle having one of its ends abutting the casing and the other end abutting another wall of the receptacle, and top and bottom walls or covers closing the upper and lower ends of the receptacle and the spaces between said receptacle and the casing.

2. A box for shipping and storing butter consisting of a casing having removable top and bottom walls, a receptacle consisting of upper and lower walls or covers fitting snugly in the casing, and intermediate walls spaced from the casing to provide suitable spaces and fitting snugly between said upper and lower walls, all of the walls of said receptacle being unsecured, and spacing strips secured to the top, bottom and intermediate walls of the receptacle and engaging the casing.

3. A box for shipping and storing butter consisting of a casing formed with a seat for a cover, and having one wall formed with a recess and the opposite wall with an inclined cam face, a cover having a tongue on one edge for reception in said recess, the opposite edge portion of the cover being rounded whereby when the cover is forced downwardly toward its seat and said rounded portion engages the cam face of the casing, said cover will be shifted laterally to more firmly engage its tongue in said recess, and means for securing said cover after it has been seated.

4. In a box of the type set forth, a casing formed with an internal seat, and having a recess whose mouth is flared, a cover adapted to engage said seat, and having a tongue for wedging engagement in said recess, and means adapted engage and draw said cover to its seat when it is being shifted to force said tongue into the recess of the casing.

5. In a box of the type set forth, a casing having side and end walls and formed in one end portion with a seat, one of said walls being formed with a transverse recess, the opposite wall having an inclined face, a cover adapted to engage on said seat in the casing and being provided with inclined or cam portions, a tongue on one edge of said cover for engagement in said recess, the opposite edge portion of said cover being rounded and adapted to engage the inclined face of the casing, lugs secured to the casing and engaging said inclined or cam portions of the cover and adapted to move the cover positively to its seat when the same is being shifted to force the tongue firmly into said recess.

Signed at Seattle, Washington, this 21 day of February, 1906.

ARTHUR C. HUMMER.

Witnesses:
C. H. WINDERS,
M. P. TREGONING.